Aug. 30, 1955 L. F. THIRY 2,716,566
RUBBER MOUNTINGS
Filed July 19, 1949 2 Sheets-Sheet 1

INVENTOR.
Leon F. Thiry
BY
Harness, Dickey & Pierce
ATTORNEYS.

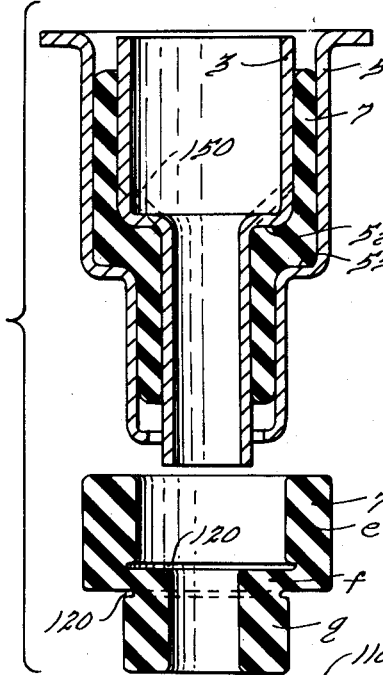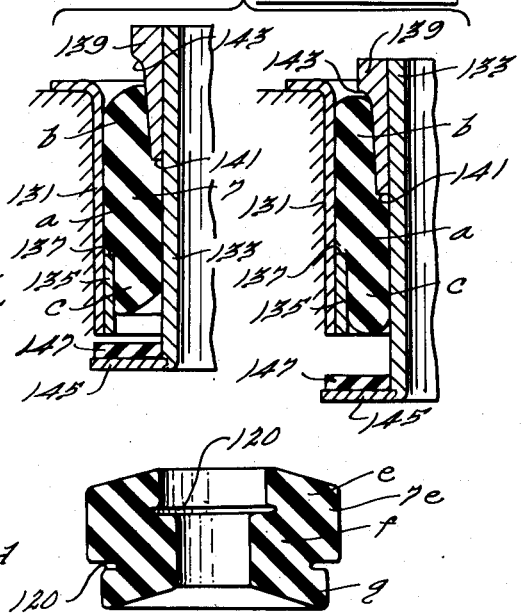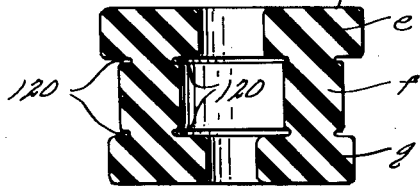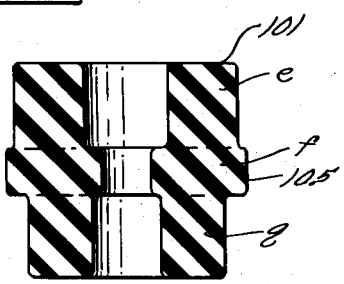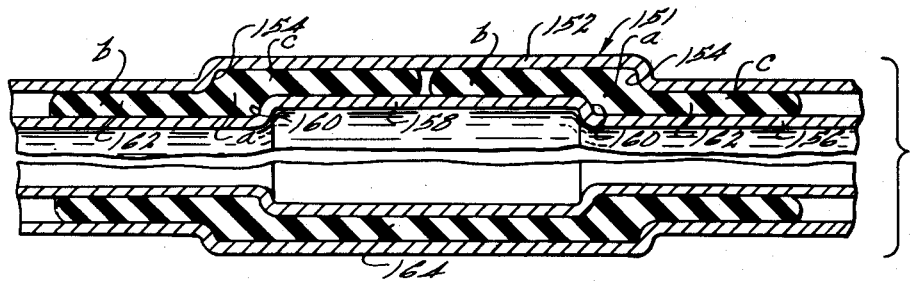

United States Patent Office 2,716,566
Patented Aug. 30, 1955

2,716,566

RUBBER MOUNTINGS

Leon F. Thiry, Montclair, N. J.

Application July 19, 1949, Serial No. 105,499

14 Claims. (Cl. 287—85)

This invention relates to flexible joints in which relatively movable members are interconnected by a layer of rubberlike material. Typical flexible joints to which the invention relates are rubber bushings and vibration mounts, the former being widely used in all machineries and especially in automobiles for interconnecting springs, chassis, shackle arms, etc., and the latter being widely used for engine supports and the like in the automotive, aircraft, and railroad industries, etc. These joints are designed and shaped to have their main movements around or along a longitudinal axis and also to have secondary transverse or conical movements. Thus, a common construction comprises members having surfaces of revolution such as cylinders or cones interconnected by a nonslidable annular layer of rubber.

This invention relates to all flexible joints of these general types, and its object is to improve the manner in which they resist forces applied in an axial direction.

In these flexible joints the rubber insert may be bonded to the members but it is preferably introduced therebetween in a state of radial compression. In either case it is desirable to supplement the normal shear resistance of the insert to forces applied in an axial direction so as to increase the axial load-carrying capacity of the joint. In vibration mountings this should be done in such a way as not to decrease the permissible axial deflection of the joint and in any type joint should not decrease permissible angular deflection or create material nonuniformities in the distribution of stress through the rubber insert. Such nonuniformities lower the efficiency of the joint and, if marked, become stress concentrations that are likely to result in tearing or actual separation of the portions of the insert with a consequent rapid destruction of the joint. In the case of joints having an insert which is not bonded but merely in a state of radial compression, the means for increasing the axial load-carrying capacity should also function to help prevent slippage or pistoning of the members relative to the rubber under the increased loads since such slippage results in rapid attrition of the insert.

Efforts have, of course, been made to increase the axial load capacity of flexible joints of the prior art. One of the most successful of these has been applied to vibration mounts and consists in providing bumpers or shoulders to engage the ends of the rubber insert so as to positively prevent slippage or pistoning and cause extrusion of the rubber around the sides of the shoulder to thereby increase resistance to axial movement. This arrangement, however, increases axial load capacity at the expense of permissible axial movement and also creates undesirable stress concentrations, thus reducing the efficiency of the rubber mass as a whole with respect to its resistance to axial movement. Such is the case because extrusion of the rubber by the shoulders throws the burden of resisting axial forces on the relatively small end portions of the insert immediately adjacent the shoulders. These are, therefore, areas of high stress concentrations, and in actual use, mounts of this type are characterized by relatively short stroke and premature failure of the end portions of the insert due to tearing and in some cases due also to attrition caused by slipping of the end portions. An additional disadvantage of this type mount is that dirt particles work their way between the shoulders and the rubber and changes the load-deformation characteristics of the unit. If such shoulders are used in rubber torque bushings, they greatly reduce the permissible angular deflection.

In the flexible joints of this invention, the axial load-carrying capacity is increased by means which positively prevents wholesale slippage of the insert and which not only does not introduce harmful stress concentrations but actually provides a favorable distribution of stress which increases the efficiency of the rubber mass in resisting axial deformation. Furthermore, it has no harmful effects on the angular deformability or permissible axial deflection and it does not permit the entrance of grit to change the characteristics of the joint.

In the present joint, the desired results are achieved by providing axially spaced shoulders intermediate the ends of the insert so that the latter has end portions of preferably equal length extending axially beyond the shoulders. The central portion of the insert between the shoulders constitutes, in effect, a reservoir from which rubber is pumped into the end portions by movement of the shoulders toward each other. The resistance of the rubber in the end portions to the influx of rubber from the central portion provides the primary resistance to axial movement.

Other features and advantages of the invention will be pointed out in the description of the preferred forms of the invention which are shown by way of illustration in the accompanying drawings, wherein:

Fig. 7 is a partial axial section of another form of the mounting;

Fig. 8 shows a type of insert that will be substantially equally radially compressed in assembly;

Fig. 9 shows a type of insert in which the central zone will be substantially free from radial compression in assembly.

Fig. 10 is a partial sectional view of a modified form of flexible joint constructed according to the invention in loaded and unloaded position;

Fig. 11 is a section through the insert used in the joint of Fig. 10; and

Fig. 12 is a cross section through two bushings having two pairs of opposing shoulders.

Figure 1:
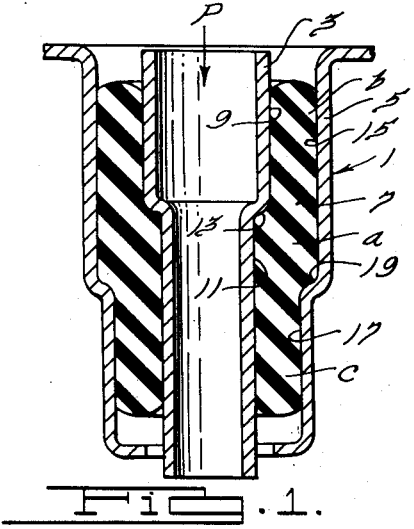
Figure 1 is an axial section through one form of vibration mounting embodying the invention.

The vibration mount 1 shown in Fig. 1 for the purpose of illustrating the principles of the invention has inner and outer sleeves 3 and 5 which are coaxial. So far as the characteristics of the mount are concerned, only the outer periphery of the inner sleeve and the inner periphery of the outer sleeve are important since these define the annular chamber containing the rubber insert 7. The inner sleeve 3 is cylindrical, but is stepped in its outer diameter so that it has an upper portion 9 of larger diameter and a lower portion 11 of smaller diameter, these portions being joined by a radial shoulder 13 which lies in a plane normal to the axis of the mount. Likewise, the outer sleeve 5 is cylindrical, but stepped in its inner diameter so that it has an upper portion 15 of larger diameter and a lower portion 17 of smaller diameter which are interconnected by a radial shoulder 19 that lies in a plane normal to the axis of the mount. The inner and outer sleeves 3 and 5 are assembled so that the larger upper peripheries 9 and 15 of each are facing, the smaller lower peripheries 11 and 17 are facing, and the shoulders 13 and 19 are axially spaced and face each other. It may be noted that the corners of the shoulders are preferably rounded to avoid localized build-ups of stress and to facilitate assembly. It will be recognized that this arrangement of the shoulders in effect divides the annular chamber between the sleeves (containing insert 7) into three zones or regions, viz., central zone $a$ between the shoulders 13 and 19 and end zones $b$ and $c$ between the upper and lower portions of the sleeves and flanking the shouldered central zone $a$. Zone $a$, of course, has a greater radial thickness than either zone $b$ or $c$. The zones $b$ and $c$ are preferably at least as long as the central zone $a$ and may be as much longer than the central zone as desired. The zones $b$ and $c$ and are preferably also of equal length so as to provide equal resistance to axial movement by a mode of operation that will be explained hereinafter. Also each of the surfaces forming the walls of the end zones is preferably, but, of course, not necessarily, defined by a substantially rectilinear generatrix.

The particular form of mounting illustrated in Fig. 1 is relatively long compared with its diameter, but it will be understood that the load capacity for a given axial length may be increased by increasing the diameters of both the inner and outer sleeves as much as is desired. Similarly, the axial load capacity for a given diameter may be increased by increasing the axial length of the mounting and particularly the zones $b$ and $c$ thereof.

Any suitable form of rubberlike insert 7 may be interposed between the sleeves 3 and 5 by any suitable process so long as it has continuous, intimate, nonslipping engagement with the peripheries of the sleeves. Regardless of what form of insert or what mode of insertion and attachment is employed, it will be found that the present form of sleeves increases the resistance to slippage or pistoning and makes it possible to withstand a greater range of axial loads.

While the rubber insert may be molded in place or to final form and bonded to the sleeves, experience has shown that the best joints embodying the principles of this invention are obtained by "shooting" the insert 7 between the inner and outer sleeves in the manner described in the present inventor's United States Patent No. 1,739,270. This is particularly true if the joint is to be subject to torsional loads which will rotate one of the sleeves relative to the other about the axis of the joint. When the insert 7 is shot in the manner shown in Patent No. 1,739,270, it is distorted by radial compression which causes an axial elongation, and care should be taken in designing the sleeves 3 and 5 to make them sufficiently long so that the entire insert is at all times confined and compressed therebetween. Any desired degree of distortion may be employed but the best results are obtained when the radial thickness of the rubber in zones $b$ and $c$ reduced on assembly to from 33% to 66% of its thickness in the free state.

Figure 2:
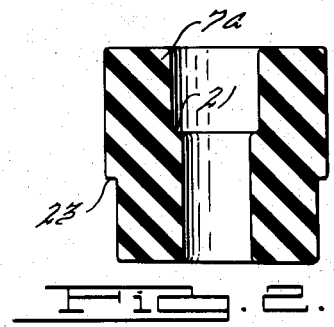
Figs. 2, 3 and 4 illustrate various types of rubber inserts which are used in the present mounting.
Figure 3:
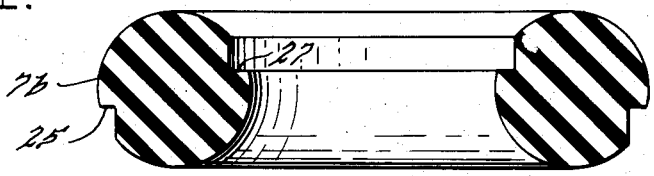
Figure 4:
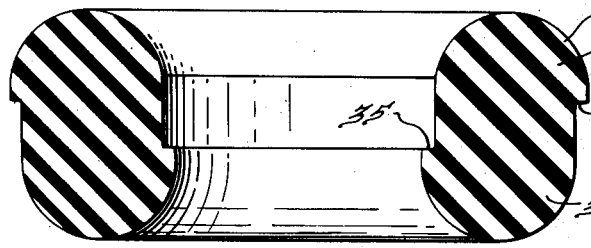

Figs. 2–4 show three forms of rubber rings 7a, 7b and 7c in the free state which may be subsequently shot into the sleeves to form the radially compressed and axially elongated insert 7. The ring 7a of Fig. 2 is one form that may be employed to produce the mounting of Fig. 1 and is illustrated in approximately the proper relative proportions. The ring 7a is cylindrical but stepped in diameter to provide an inner radial shoulder 21 for engagement with the shoulder 13 and an outer radial shoulder 23 for engagement with the shoulder 19. Those in the art will recognize that the shoulders 21 and 23 facilitate the insertion of the ring 7a, since they insure proper location of the insert 7 in the sleeves. The ring 7a is, of course, shorter and radially thicker than the space between the sleeves 3 and 5 so as to permit radial compression and axial elongation. The excess width is desirably but not necessarily equally distributed between a smaller inner diameter and a larger outer diameter of the ring as compared with the space between the sleeves 3 and 5. Where the joint is required to take large angles of rotation between the sleeves and about the axis of the joint it is advantageous to increase the inside diameter of the insert on assembly by an amount slightly greater than the reduction in its outside diameter.

When desired, a greater amplitude of axial movement may be achieved by increasing the ratio of the diameter of the inner sleeve to that of the outer sleeve and by utilizing an insert which in its free state more nearly approaches a circular cross section. Thus, as an example, the form of the insert may be that of ring 7b of Fig. 3. As there shown, the ring is a torus, i. e., circular cross section, having a cutout on its outer periphery to form a shoulder 25 for seating on the shoulder 19. It may also have a cutout on its inner periphery to form a shoulder 27 to cooperate with shoulder 13. The ring 7b is shot between its sleeves in the same manner as ring 7a. This form of ring has, after insertion, primarily a rolling contact with the sleeves and therefore increases the axial deformability of the mount. It will be understood that the inner and outer sleeves between which ring 7b is mounted may be generally similar to those shown in Fig. 1 except that the diameters of both sleeves are increased so that the diameter of the inner sleeve exceeds the inner diameter of the insert in its free state and the outside sleeve is of less diameter than the outside diameter of the insert in its free state.

The ring 7c of Fig. 4 is a modification of ring 7b and possesses its characteristics in improved form. It comprises intersecting tori, the upper torus 29 being formed by a circular generatrix spaced from the axis of the mount 1 by a greater distance than that of the lower torus 31, these distances being approximately equal respectively to the mean diameters of the zones $b$ and $c$. Outer and inner shoulders 33 and 35 are formed at the intersection of the tori 29 and 31 and these cooperate with the shoulders 19 and 13 of the sleeves as in the rings 7a and 7b. The particular merit of the ring 7c is that the tori 29 and 31 are adapted especially to fit in their respective upper and lower zones $b$ and $c$, and thus permit a true rolling action for a limited stroke and yet the axial length of the insert and therefore its load capacity is increased.

Regardless of the shape of the insert 7 in the free state, when an axial compression load P is applied to one of the sleeves of the assembled amount, the shoulders 13 and 19 move toward each other to compress that portion of the insert in zone $a$ and force into the narrower zones $b$ and $c$ a volume of this central zone rubber which is dependent upon the extent to which the shoulders move toward each other. At least three different components of resistance are provided to this relative movement of the inner and outer sleeves 3 and 5. First there is the resistance of the rubber in zone $a$ to compression, and also the resistance of the rubber in zone $a$ to extrusion into the narrower zones $b$ and $c$. A second and very high resistance is provided by the rubber in zones $b$ and $c$ to the entry thereinto of rubber from zone $a$. This resistance exists because the rubber in zones $b$ and $c$ cannot slip on the walls of the sleeves 3 and 5. Each of the radial fibers is therefore elongated by curving convexly outwardly and this is transmitted to the ends of the rubber insert in these zones which must therefore simply bulge outwardly at the ends. The resistance of each of the end zones $b$ and $c$ is a function of its length and to prevent an unbalanced condition it is preferably that they be of substantially equal length.

There is also a substantial third component of resistance when the insert 7 has been either bonded or inserted into the sleeves so as to be primarily a nonrolling-type joint. This is the resistance of the rubber mass to shear as the sleeves are moved relatively to each other and, like the second resistance, exists because the insert 7 cannot slip on the sleeves. However, when the insert 7 is normally of a rolling form, as rings 7b and 7c, there is a tendency for a rolling action to take place so that the third component of resistance of these rings as inserts will generally be less than that of the ring 7a.

From the foregoing analysis it will be appreciated that the shoulders 13 and 19 serve to materially and beneficially influence the axial load-carrying capacity of the mount 1. This, however, is not done by thrusting excessive loads upon any localized areas of the insert. The natural resistance of the rubber in central zone $a$ to compression and extrusion is supplemented by the resistance of the rubber in the end zones $b$ and $c$ to the increase in length necessary to accommodate the compressed and extruded central zone rubber. Thus, the entire mass of rubber is efficiently working against deflection under the load P, and the unit stress on any particular area is held to a minimum. As a result of the highly efficient use of the insert, its mass may be smaller than in prior mounts without any danger of failures due to stress concentrations.

It is to be noted that the increased axial loads can be applied to the mount 1 without resulting in wholesale slippage due to the fact that the shoulders 13 and 19 help to positively locate the insert 7 in such a way as to inhibit its movement relative to the sleeves 3 and 5.

Other advantages of the mount 1 should be mentioned. One advantage which is very important from a practical standpoint will be apparent to those in the art. This is immunity to the presence of dirt and foreign materials. In the prior joints employing end bumpers foreign material can be trapped between the rubber insert and the bumper and modify the load characteristics of the joint since during axial movements in both directions the external bumpers get free from their adjacent rubber shoulders and act like mouths which open to swallow the dirt, grit, oil, etc. In the present mount, the shoulders 13 and 19 are always embedded in the rubber mass so that there is no possibility of their being reached by materials which might produce undesirable effects.

A further advantage so far as vibration mounts are concerned is that the influence of compression in central zone $a$ is small as compared with the main resisting force of tension in the end zones $b$ and $c$. Thus advantage is taken of the well-known superiority in antivibration practice of tension over compression stresses without the usual drawbacks heretofore incident to the employment of tensile stresses for this purpose.

The broad principle of the invention is, of course, not exclusively exemplified in the mount 1. Outside of variations in the free shape and method of assembling the insert 7, the usual modifications will concern the shape of the facing peripheries of the inner and outer sleeves 3 and 5 and the shape and relative position of the shoulders 13 and 19. Mount 40 of Fig. 5 differs from mount 1 in both these respects.

In mount 40, the upper portions 41 and 43 of the inner and outer sleeves 3 and 5 and the lower portions 45 and 47 of these sleeves are tapered or conical. The upper and lower conical portions are joined by shoulders 49 and 51 which, with respect to their respective sleeves 3 and 5, taper or are inclined away from each other and toward their respective end zones $b$ and $c$. Tapering of the shoulders 49 and 51 tends to ease extrusion of the rubber from zone $a$ into zones $b$ and $c$, and also to help shooting of the inner sleeve. If increased resistance to extrusion and very high resistance to axial deflection happens to be desired, radially overlapping shoulders can be used, such as shoulders 53 and 55 of Fig. 7. It is thus apparent that by varying the slope and width of the shoulders various degrees and resistance to axial movement may be developed.

Figures 5, 6:
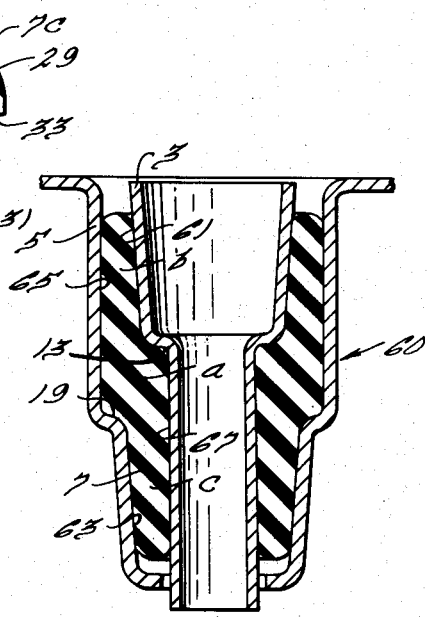
Figs. 5 and 6 are axial sections through modified forms of mounting.

The conical or tapered portions of the mount 40 provide an increased resistance to deformation in one direction, in Fig. 5 this increased resistance opposing the force P. The angles of taper of the various portions need not be uniform as shown in Fig. 5, but may be varied as desired. In mount 60 of Fig. 6, for example, tapered portions 61 and 63 of the inner and outer sleeves 3 and 5 are opposed by cylindrical portions 65 and 67 of these sleeves. Preferably, however, the angle which the tapered surface makes with the axis of the mount is relatively small, i. e., less than eight degrees for the type of insert shown in Fig. 2 and less than five degrees for rolling inserts of the type shown in Figs. 3 and 4.

While the foregoing description of Figs. 1–7 has largely centered about vibration mountings, it will be evident that the principles of the invention may be embodied in other forms of flexible joints such as rubber bushings, sometimes referred to as torque bushings. There is a difference in degree between the functioning of vibration mountings and rubber bushings. The former are usually intended to have relatively small or no angular deflection but to absorb axial vibration of axial loads. Bushings, on the other hand, are intended to accommodate rather large angular deflections and usually carry heavy radial loads. For that reason the shot type of radially compressed and axially extended bushing is far superior to ordinary bonded types when the joint is to sustain either heavy radial loads or high angular deflections about the joint axis. Often bushings are required to resist substantial endwise or axial movement in which case the overlapping shoulder construction of Fig. 7 may be preferable.

The differences between vibration mounts and bushings may also affect the preferred shapes of the rubber insert 7. Those in the art are now familiar with the geometric techniques required to determine the free shape of the insert so that after assembly it is radially compressed and axially elongated the required amounts. Such compression is achieved, of course, by a substantial reduction in thickness of the rubber insert in assembly between the members of the joint. It will be realized that the techniques are still the same in the practice of the present invention. It should be noted, however, that in the final assembly the central zone $a$ is thicker than the end zones $b$ and $c$ and the latter are of different radii. These differences should be taken into consideration in proportioning the insert. In torsion bushings, where angular deformation and radial load capacity are all-important, it is desirable that rubber in each of the three zones be reduced in thickness in such amounts that substantially the same stress conditions prevail in each. Thus, in order to achieve the desired degree of radial compression, a typical insert 101 for a rubber bushing having the sleeves 3 and 5 of Fig. 1 would be of the form shown in Fig. 8. This differs from the insert 7a in that the central portion $f$ of the insert to fit in zone $a$ is thicker, though the end portions $e$ and $g$ are the same as in Fig. 2. Thus, it has a smaller inner diameter 103 and a larger outer diameter 105. This increase in thickness in the central zone is properly proportioned by geometric methods to result in substantially the same degree of radial compression of the rubber in central zone $a$ as in the rubber in end zones $b$ and $c$.

By way of contrasting the requirements of torsion bushings and vibration mounts, the insert 110 of Fig. 9 may be compared with the insert 101 of Fig. 8. This insert also has three axially adjacent annular sections $e$, $f$, and $g$ which fit in zones $b$, $a$, and $c$, respectively. The sections $e$ and $g$ are twice as thick in the free state as they are when inserted in the mount of Fig. 1. Section $f$, however, of insert 110 is substantially the same width as central zone $a$ and on the same radius so that it will be subject to no radial stresses in assembly. It will therefore, have angular reflection and radial load capacities which are considerably inferior to those possessed by sections $e$ and $g$. In vibration mounts, however, these may not be important so long as these particular properties are not demanded and there are benefits to be obtained in such mounts by allowing the rubber in central zone $a$ to be initially unstressed or stressed to a lesser extent than the rubber in zones $b$ and $c$. When in this condition, the rubber in zone $a$ provides little resistance to axial deflection of the mount which is the principal movement to be absorbed. Its ability to furnish rubber to the end zones b and c as the shoulders move together is not impaired, however, by the fact that it is not prestressed. Thus in vibration mounts where the tensile stresses in the end zones b and c provide the principal load-resisting forces and are preferred to compressive stresses in zone a, a low initial stress in zone a, in so far as it adversely affects the resistance of the rubber in that zone to axial compression, may be advantageous since it increases permissible deflection for a given load.

It will be apparent that in assembling the various inserts, relative radial movement of the rubber sections (e. g., e, f, and g) will occur as the outer periphery is compressed and the inner periphery is expanded. If appreciable, this movement may, due to localization of stresses, cause failure of the rubber. To prevent this, radially extending, thin annular grooves 120 (Figs. 7, 9 and 11) may be provided at the junctures of the three sections.

It has been mentioned hereinbefore that the length of each of the end zones b and c preferably exceeds that of the central zone a. This, however, is not a necessary feature and, in fact, when demanded, rather soft joints can be obtained by increasing the length of central zone a while shortening the end zones b and c until the required softness is obtained, but in no case shortening the end zones b and c to less than a measurable minimum length. A joint of this construction is shown in Figs. 10 and 11. In this construction the outer sleeve 131 is secured to a foundation and the inner sleeve 133 is movable. The sleeve 131 has an inserted sleeve 135 which provides a shoulder 137 on its upper edge and the inner sleeve 133 has a bushing 139 secured thereon which provides a shoulder 141 on its lower edge. The shoulders 137 and 141 face each other and define the central zone a, the portions on either side constituting the end zones b and c as before. The bushing 139 may be provided with a bumper shoulder 143 to limit downward movement of the sleeve 133 relative to sleeve 131. A bumper construction for limiting upward movement of the member 133 relative to sleeve 131 is also provided comprising a radial flange 145 riveted to the end of the sleeve 133 and having a rubber washer 147 on its upper radial face. The insert 7e in the free state for the joint of Fig. 10 is shown in Fig. 11 and is designed to receive about 75% axial elongation upon shooting. The relative lengths of the sections e, f, and g are such that after shooting, the end zones b and c are shorter than the central zone a. The mount thus has comparatively less resistance to axial movement of the inner sleeve 133 than those shown hereinbefore. A feature of note is the conical or inwardly and upwardly tapered end surfaces of the insert 7e in the free state of Fig. 11 and in the unloaded condition of the joint as shown at the left of Fig. 10. These enable maximum deflection or stroke since under ordinary load (shown at the right of Fig. 10) the end surfaces become curved due to the mechanism hereinbefore described with their tangent planes substantially normal to the axis of the mount. Additional deflection, however, is permitted since the end surfaces still have the capacity to become oblique or tapered in a direction opposite to that in the unloaded condition.

Fig. 10 is of additional interest since it illustrates how the central zone a serves as a reservoir for rubber. Rubber from this zone is pumped into the end zones b and c by movement of the shoulders 141 and 137 toward each other with a consequent decrease in volume of the zone a and increase in volume and length of the zones b and c.

The joints so far described incorporate only a single pair of facing shoulders and hence will have substantially greater axial load capacity in one direction than the other. They do, however, have substantial axial load capacity in both directions, particularly if the insert is of the non-rolling type shown in Fig. 2. However, the invention is by no means limited to flexible joints having but a single pair of opposed shoulders. Fig. 12 illustrates a bushing that has two pairs of shoulders and which is therefor equally capable of resisting axial forces in either direction. It includes an outer sleeve 151 that has an intermediate portion 152 of enlarged diameter to provide axially spaced facing shoulders 154. An inner sleeve 156 is coaxial with the outer and has an intermediate portion 158 of enlarged diameter of shorter length than portion 152 and fitting therein to provide shoulders 160 that are axially spaced from and face the shoulders 154 and define the central zone a that separates the end zones b and c. Two axially spaced inserts 162 may be used and it is evident that each set of zones a, b, and c is operative to provide axial load resisting characteristics in the manner already described. A single insert 164 (bottom of Fig. 12) may be used with the same results providing that the intermediate zones b and c are equal in length to their respective extreme end zones b and c.

Those in the art will appreciate that when the shoulders are of fairly substantial width, or overlapping as in Fig. 7, that in spite of tapered or well rounded shoulders difficulties in shooting the insert 7 may be encountered. The techniques to be employed in these cases form the subject matter of separate invention, but as a general indication of one way in which assembly may be accomplished, reference may be made to Fig. 7. As there illustrated, the mount is assembled with the inner member 3 formed in a generally conical shape adjacent the shoulder 53, as indicated at 150 in dotted lines. After assembly, the conical portion 150 can be expanded by suitable means to the cylindrical shape shown.

In addition to the advantages and modifications of the invention that have been described, others will be apparent to those in the art. Hence it is not intended to restrict the invention to the specific details that have been shown for the purpose of illustrating its principles.

What is claimed is:

1. In a flexible joint or mounting having an axis along which and about which movement occurs, the combination of inner and outer longitudinal rigid and relatively rotatable members, the outer member having first and second annular surfaces and a first transverse shoulder joining them and the inner member having third and fourth annular surfaces and a second transverse shoulder joining them and being axially separated from the first shoulder, said annular surfaces being substantially coaxial with said axis, a rubber annulus between the members and intimately engaged to a substantial length of each of said surfaces to prevent relative slippage of the rubber and said surfaces, said members being arranged so that the first surface is opposite the third surface and the second shoulder and the fourth surface is opposite the second surface and the first shoulder, said rubber annulus having end portions of substantial length located respectively between said first and third surfaces and between said second and fourth surfaces and in said intimate non-slipping engagement therewith, said rubber annulus having an intermediate portion between said end portions, located between and substantially completely filling the space between the shoulders and annular surfaces to provide an intermediate zone of rubber which will be deformed by the shoulders into end zones defined by said opposed surfaces against the resistance of said end portions therein when load is applied to reduce the distance between said shoulders, said end zones and end portions of rubber being of such length relative to the intermediate zone that they provide a substantial part of the resistance of the joint or mounting to longitudinal deflection.

2. The invention set forth in claim 1 wherein said rubber annulus lies wholly between said surfaces and shoulders during both loaded and unloaded condition of the joint or mounting.

3. The invention set forth in claim 1 wherein the rubber annulus is bonded throughout its length to said surfaces to provide said non-slipping engagement.

4. In a flexible joint or mounting, the combination of inner and outer longitudinal rigid and relatively rotatable members, the outer member having first and second axially separated annular surfaces and a first transverse shoulder joining them and the inner member having third and fourth axially separated annular surfaces and a second transverse shoulder joining them, a rubber annulus between the members and intimately engaged to a substantial length of each of said surfaces to prevent relative slippage of the rubber and said surfaces, said members being arranged so that the first surface is opposite the third surface and the second shoulder and the fourth surface is opposite the second surface and the first shoulder, said rubber annulus having end portions of substantial length located respectively between said first and third surfaces and between said second and fourth surfaces and in said intimate engagement therewith, said rubber annulus having an intermediate portion between said end portions located between and completely filling the space between the shoulders and annular surfaces to provide an intermediate zone of rubber which will be deformed by the shoulders into end zones defined by said opposed surfaces against the resistance of said end portions therein when load is applied to reduce the distance between said shoulders, said end zones and end portions of rubber being of such length relative to the intermediate zone that they provide a substantial part of the resistance of the joint or mounting to longitudinal deflection, said rubber annulus when the joint or mounting is not under load lying wholly between said surfaces and shoulders and being in a state of substantial transverse compression and longitudinal elongation between them to provide said non-slipping engagement.

5. The invention set forth in claim 4 wherein at least one of said shoulders lies in a plane normal to the axes of said annular surfaces.

6. The invention set forth in claim 4 wherein at least one of said shoulders is frusto-conical and divergent outwardly from the inner member.

7. The invention set forth in claim 4 wherein the corners of the shoulders are spaced transversely from each other.

8. The invention set forth in claim 4 wherein the shoulders extend toward the opposite members so that the shoulders partly project over one another.

9. The invention set forth in claim 4 wherein the transverse end faces of the rubber annulus are frusto-conical and inclined in the same longitudinal direction.

10. The invention set forth in claim 4 wherein said rubber annulus is a ring of substantially circular cross section cut away on its inner and outer sides to provide inner and outer transverse shoulders, said ring in unstressed condition being of shorter axial dimension and greater transverse dimension than the space which it occupies between the inner and outer members whereby when in position between the members it is transversely compressed and axially elongated.

11. The invention set forth in claim 4 wherein said rubber annulus comprises a ring consisting of intersecting tori one of which is of greater diameter than the other to provide inner and outer shoulders formed at the intersections of the tori, said ring in unstressed condition being of shorter axial dimension and greater transverse dimension than the space which it occupies between the inner and outer members whereby when in position between the members it is transversely compressed and axially elongated.

12. In a flexible joint or mounting, the combination of inner and outer longitudinal rigid and relatively rotatable members, the outer member having first and second axially separated annular surfaces and a first transverse shoulder joining them and the inner member having third and fourth axially separated annular surfaces and a second transverse shoulder joining them, a rubber annulus between the members and intimately engaged to a substantial length of each of said surfaces to prevent relative slippage of the rubber and said surfaces, said members being arranged so that the first surface is opposite the third surface and the second shoulder and the fourth surface is opposite the second surface and the first shoulder, said rubber annulus having end portions of substantial length located respectively between said first and third surfaces and between said second and fourth surfaces and in said intimate engagement therewith, said rubber annulus having an intermediate portion between said end portions located between and completely filling the space between the shoulders and annular surfaces to provide an intermediate zone of rubber which will be deformed by the shoulders into end zones defined by said opposed surfaces against the resistance of said end portions therein when load is applied to reduce the distance between said shoulders, said end zones and end portions of rubber being of such length relative to the intermediate zone that they provide a substantial part of the resistance of the joint or mounting to longitudinal deflection, said rubber annulus when the joint or mounting is not under load lying wholly between said surfaces and shoulders and being in a state of substantial transverse compression and longitudinal elongation between them to provide said non-slipping engagement, said rubber annulus being cylindrical and stepped in diameter interiorly and exteriorly to provide inner and outer transverse shoulders engaging said second and first shoulders, the annulus in unstressed condition being substantially shorter and thicker than the space that it occupies between the inner and outer members whereby when in position between the members it is transversely compressed and axially elongated.

13. The invention set forth in claim 12 wherein said rubber annulus has thin peripheral grooves therein at the cross sections adjacent said transverse shoulders.

14. A double-acting flexible joint comprising a pair of laterally spaced members each having a pair of axially spaced lateral shoulders extending toward the other member, the pair of shoulders on the first member facing each other and the pair on the second member facing in opposite directions, the latter opposite facing second member shoulders being spaced apart by a lesser axial distance than the first member shoulders so that each of the second member shoulders faces a first member shoulder, means providing inserts of rubber between the member engaging the shoulders and substantially completely filling the space between the members and shoulders and extending axially beyond the shoulders, the facing shoulders on the first and second members defining a pair of central chambers bordered on either side by end chambers whereby, when the members have relative axial movement, i. e., parallel to the layer of rubber, so that a pair of facing shoulders approaches each other, rubber in the central chamber defined by said approaching pair of shoulders flows into the end chambers bordering thereon against the resistance of rubber in said end chambers.

References Cited in the file of this patent

UNITED STATES PATENTS

| | | |
|---|---|---|
| 1,738,532 | Harbour | Dec. 10, 1929 |
| 1,783,410 | Cowell | Dec. 2, 1930 |
| 1,892,065 | Markey | Dec. 27, 1932 |
| 2,185,019 | Stewart | Dec. 26, 1939 |
| 2,313,472 | Halfvarson | Mar. 9, 1943 |
| 2,432,050 | Thiry | Dec. 2, 1947 |
| 2,468,900 | Thiry | May 3, 1949 |
| 2,608,751 | Hutton | Sept. 2, 1952 |

FOREIGN PATENTS

| | | |
|---|---|---|
| 260,681 | Switzerland | Aug. 1, 1949 |
| 282,188 | Great Britain | Dec. 22, 1927 |
| 407,788 | Great Britain | Mar. 29, 1934 |
| 794,135 | France | Dec. 2, 1935 |